United States Patent
Labadie et al.

(10) Patent No.: US 6,874,807 B1
(45) Date of Patent: Apr. 5, 2005

(54) COUPLING DEVICE FOR A HANDLING TROLLEY

(75) Inventors: Jean Labadie, Laval (FR); Jean-Pierre Cribier, Laval (FR)

(73) Assignee: Valeo Thermique Moteur, La Verriere (FR)

( * ) Notice: Subject to any disclaimer, the term of this patent is extended or adjusted under 35 U.S.C. 154(b) by 32 days.

(21) Appl. No.: 10/129,277

(22) PCT Filed: Nov. 9, 2000

(86) PCT No.: PCT/FR00/03130

§ 371 (c)(1),
(2), (4) Date: Jul. 31, 2002

(87) PCT Pub. No.: WO01/34415

PCT Pub. Date: May 17, 2001

(30) Foreign Application Priority Data

Nov. 9, 1999 (FR) .......................................... 99 14073

(51) Int. Cl.⁷ .......................... B62B 1/00; B62D 53/00; B61D 17/00; F16C 11/00; B61G 1/10
(52) U.S. Cl. .................. 280/656; 280/408; 280/33.991; 280/491.4; 280/481; 105/364; 403/61; 213/75 R
(58) Field of Search ................................ 280/656, 655, 280/655.1, 8, 16, 408.1, 408, 410, 411.1, 416.3, 416.1, 419, 442, 444, 462, 463, 479.3, 480.1, 482, 483, 484, 485, 486, 489, 491.1, 491.2, 491.3, 493, 504, 506, 508, 515; 213/75 R; 403/61, 64; 244/3; 180/14.1–14.5, 14.6, 14.7; B60D 1/00; B62B 1/00; B62K 1/00

(56) References Cited

U.S. PATENT DOCUMENTS

| 1,326,839 | A | * | 12/1919 | Bish ........................... 213/179 |
|---|---|---|---|---|
| 1,648,901 | A | * | 11/1927 | Helmick ..................... 105/364 |
| 2,454,641 | A | | 11/1948 | Figmick |
| 2,780,480 | A | | 2/1957 | Schwab |
| 3,140,882 | A | | 7/1964 | Mutto |
| 3,154,325 | A | * | 10/1964 | Thompson et al. ......... 280/478 |
| 3,180,657 | A | * | 4/1965 | Molter, Sr. .................. 280/489 |
| 3,313,378 | A | * | 4/1967 | Freeman et al. ............. 188/21 |
| 3,664,687 | A | * | 5/1972 | Nutt, Jr. et al. ............. 280/491 |
| 3,753,574 | A | * | 8/1973 | Werle .......................... 280/478 |
| 3,874,689 | A | * | 4/1975 | Morgan ................. 280/33.991 |
| 4,029,307 | A | * | 6/1977 | Nielson ...................... 267/138 |
| 4,351,541 | A | * | 9/1982 | Propst et al. ............... 280/408 |

FOREIGN PATENT DOCUMENTS

| DE | 27 46 895 | | 4/1979 | |
|---|---|---|---|---|
| DE | 2746895 A | * | 4/1979 | ................. 280/656 |
| DE | 3138108 A1 | * | 4/1983 | ................. 280/186 |
| DE | 39 13075 A1 | | 10/1990 | |
| EP | 0 838 390 A2 | | 4/1998 | |
| FR | 2 504 451 | | 10/1982 | |
| GB | 2175547 A | * | 12/1986 | ................. 280/656 |
| NL | 9 302 072 | | 6/1995 | |

* cited by examiner

Primary Examiner—Christopher P. Ellis
Assistant Examiner—G B Klebe
(74) Attorney, Agent, or Firm—Ronald Courtney

(57) ABSTRACT

A coupling device for a handling trolley comprises a drawbar (22) arranged at the front of the trolley and designed to co-operate with the hook (24) provided at the back of a tractor, in particular a trolley preceding a line of trolleys. The drawbar (22) comprises a longitudinal slot (36) wherein the hook (24) is designed to slide such that the hook can slide in the longitudinal slot between a position spaced apart wherein the trolley (10) is at a maximum distance from the tractor while it is being towed and a closer position wherein the trolley is at a minimum distance from the tractor to reduce the space requirement when it is stopped.

9 Claims, 3 Drawing Sheets

COUPLING DEVICE FOR A HANDLING TROLLEY

The invention relates to handling trolleys. It relates more particularly to a coupling device for a handling trolley, comprising a drawbar provided at the front of the trolley and designed to co-operate with a hook provided at the rear of a towing unit, in particular a preceding trolley in a line of trolleys.

The prior art already includes handling trolleys of this type, which can be used for various applications, e.g. for carrying articles in industrial environments, carrying baggage in railway stations or airports, etc.

A trolley of this kind generally comprises a drawbar provided at the front for the purpose of cooperating with a hook provided at the rear of a towing unit.

The term "towing unit" as used above can refer either to a motorised or non-motorised vehicle which provides the traction on the trolley, or another trolley situated immediately in front in a line of trolleys.

A trolley of this kind generally has two steerable front wheels and two rear wheels, which may or may not be capable of being steered.

In the case of known handling trolleys, the drawbar is generally in the form of a longitudinal element mounted in an articulated manner about a transverse axis of the trolley and provided on its front part with a ring capable of co-operating with the hook on the towing unit.

This drawbar is generally of significant length, in order to give the trolley a small turning circle and thus allow it to turn around-within a small area.

The resulting disadvantage is that the distance between the trolley and the towing unit (in particular a trolley in front) depends on the length of the drawbar and that it is therefore inevitably large.

Moreover, this distance has the disadvantage of being fixed, resulting in a significant space requirement when a line of trolleys is stationary.

The object of the invention is, in particular, to overcome the above-mentioned disadvantages.

In particular, it aims to provide a coupling device of the type defined above which makes it possible to reduce the space requirement while at the same time making it possible to turn around within a small turning circle.

It likewise aims to provide a device of this type which can be fitted easily to a trolley and which is furthermore simple to construct and does not require any special maintenance.

To this end, the invention proposes a coupling device of the type defined in the introduction, in which the drawbar has a longitudinal slot, in which the hook is designed to slide such that this hook can slide in the said longitudinal slot between a spaced-apart position, in which the trolley is at a maximum distance from the towing unit during towing, and a close-together position, in which the trolley is at a minimum distance from the towing unit so as to reduce the space requirement when stationary.

This gives a telescopic coupling allowing a variable distance between the towing unit and the trolley coupled to the latter.

The hook can slide in the slot in the drawbar between two end positions corresponding respectively to a spaced-apart position for towing and a close-together position for stops.

In the towing position, the hook automatically positions itself towards the front end of the drawbar (which is further away from the trolley), while, in the stationary position, the hook can position itself at a rear end of the drawbar (which is closer to the trolley).

In the towing position, the drawbar thus has a significant working length, allowing sharp turns while, in the stationary position, the drawbar can have a short working length, allowing the trolley and the towing unit to be moved closer together and even to a position of contact.

Thus when several trolleys are coupled in a line, they can be gathered together, one against the other, when stationary in such a way that the length of the line corresponds substantially to the sum of the lengths of the respective chassis of the trolleys.

In a preferred embodiment of the invention, the drawbar extends substantially horizontally in the positions in which it co-operates with the hook.

The drawbar is preferably connected to the front of the trolley by articulation means defining an articulation axis in such a way as to pivot between a hooking position, in which the drawbar extends substantially horizontally in order to co-operate with the hook, and a lifted position, in which the drawbar is in a raised position and is disengaged from the hook.

According to another characteristic of the invention, the drawbar forms an acute angle relative to the vertical in the raised position. This acute angle is advantageously about 10°.

According to another characteristic of the invention, the drawbar is likewise designed to pivot beyond the raised position towards an upright position, in which it extends substantially vertically under the action of the towing unit, being disengaged from the hook of the latter.

This upright position of the drawbar is obtained when the trolley and the towing unit are closest together, thus providing a compacted position which makes it possible to reduce the longitudinal space requirement.

The above-mentioned articulation means advantageously comprise an articulation extending along a substantially horizontal transverse axis.

The coupling device furthermore preferably comprises elastic return means designed to urge the drawbar towards its lifted position, while the hook extends downwards from a support provided under the towing unit in such a way that the drawbar is brought back elastically into a position in which it bears against the support in order to ensure that the drawbar and the hook co-operate automatically.

These return means thus provide the advantage of being able to return the drawbar automatically towards a raised position, making it possible to reduce the space requirement when the trolley is uncoupled from the towing unit.

These same means furthermore make it possible to urge the drawbar automatically into a position of support against the hook, thereby significantly simplifying coupling and uncoupling operations.

The elastic return means are advantageously placed between the chassis of the trolley and the draw-bar.

These elastic return means advantageously operate in tension and are then placed between a first anchoring point situated on the chassis of the trolley and a second anchoring point situated opposite the drawbar in relation to its articulation axis.

In this case, the second anchoring point is preferably situated on an angled extension provided opposite the drawbar in relation to the articulation axis and is arranged in such a way that the articulation axis of the drawbar, the second anchoring point and the first anchoring point are in the same plane in the lifted position of the drawbar.

As a result, the elastic return means then have a line of action which intersects the articulation axis of the drawbar, ensuring that the drawbar is returned automatically to its lifted position.

According to another characteristic of the invention, the hook has a transverse space requirement which is less than the width of the slot in the drawbar.

The hook preferably comprises a generally cylindrical stud having a diameter less than the width of the slot in the drawbar and a washer surrounding the stud and having a diameter greater than the width of the slot in the drawbar.

The drawbar can advantageously be formed from an angled rod which defines two substantially parallel branches joined together by a U-shaped bend.

According to another aspect, the invention relates to a handling trolley fitted with a drawbar at the front and a hook at the rear, as defined above.

In the description which follows, which is given purely by way of example, reference is made to the attached drawings, in which.

Figure 1:
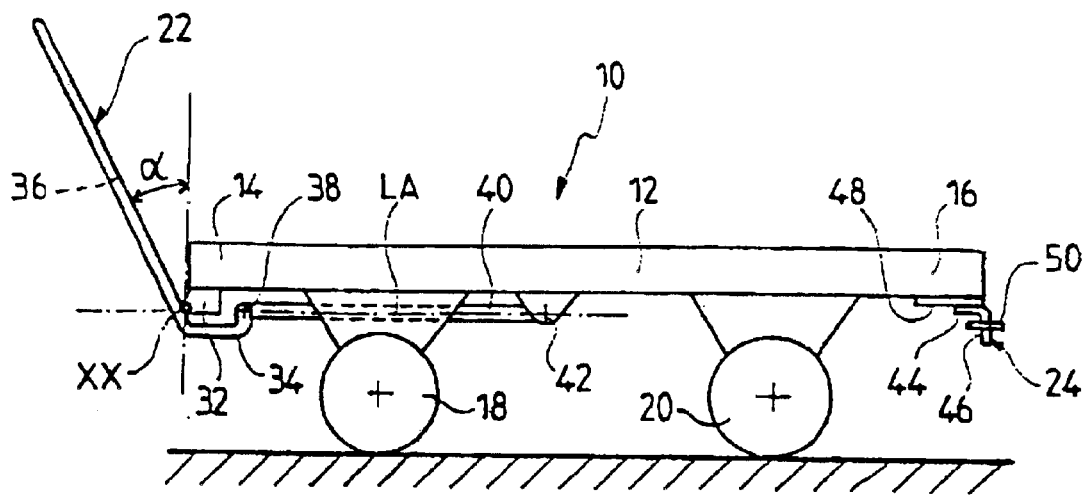
FIG. 1 is a side view of a handling trolley fitted with a coupling device according to the invention and provided with a drawbar (illustrated in a raised position) at the front and a hook at the rear.

Reference will be made first of all to FIG. 1, which shows a trolley 10 comprising a chassis 12 having a front end 14 and a rear end 16.

Mounted under the chassis 12, at the front, are two steerable wheels 18 and, at the rear, two, preferably non-steerable, wheels 20.

At the front, the trolley 10 is fitted with a drawbar 22 mounted so as to pivot about an articulation with axis XX extending transversely to the chassis 12 and substantially horizontally. At the rear, the chassis 12 is furthermore fitted with a hook 24.

The drawbar 22 of the trolley is designed to cooperate with a hook of a towing unit (not shown), which may or may not be a motorised device, or a similar trolley may precede it in a line of trolleys.

The hook 24 of the trolley is designed to cooperate with the drawbar of another trolley following it in the line of trolleys.

Figure 2:
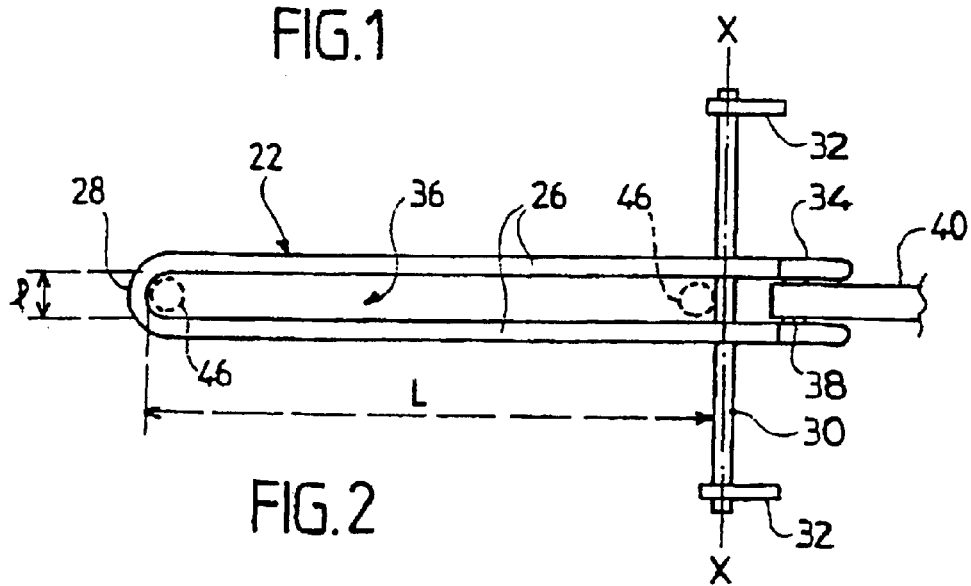
FIG. 2 is a view of the drawbar from above.

Reference will now be made to FIG. 2 for a more detailed description of the structure of the drawbar 22.

The drawbar proper is formed from an angled rod (in the example a round steel bar), which defines two substantially parallel branches 26 joined together by a U-shaped bend 28. These two branches are fixed, by welding for example, to a crossbar 30, which defines an articulation with axis XX. This crossbar is designed to co-operate with two brackets 32 (FIGS. 1 and 2) firmly attached to the front end 14 of the chassis of the trolley. The two branches 26 extend beyond the crossbar 30 so as to define an extension 34 of shorter length than the drawbar proper, the extension being provided on the opposite side of the articulation axis (XX) from the drawbar.

The two branches 26, the U-shaped bend 28 and the crossbar 30 together define a longitudinal slot 36 with a length L and a width 1.

The extension 34 has a bend (FIG. 1) and is provided with a transverse element 38 situated at a distance from the axis XX, which forms an anchoring point for an elastic return member 40. In the example, this elastic return member operates in tension and takes the form of an elastic element. However, it could also be formed by a tension spring.

The elastic member 40 has a front end connected to an anchoring point 38 and a rear end connected to an anchoring point 42 provided under the chassis 12.

It should be noted that the anchoring point 38 situated on the angled extension 34 is arranged in such a way that, in the position shown in FIG. 1, the articulation axis (XX) of the drawbar, the anchoring point 38 and the anchoring point 42 are in the same plane. In this position, also referred to as the lifted position, the drawbar 22 is in a raised position, forming an angle $\alpha$ of about 10° to the vertical.

The elastic return member 40 then has a line of action LA (FIG. 1) which intersects the articulation axis (XX) of the drawbar, ensuring that the drawbar is returned automatically to its lifted position, which is thus a rest position.

This rest position of the drawbar 22 allows an operator to put his foot between the branches 26 of the drawbar and the front end 14 of the trolley to lower the branches of the drawbar towards a substantially horizontal position with a view to a hooking or coupling operation as described below.

Figure 3:
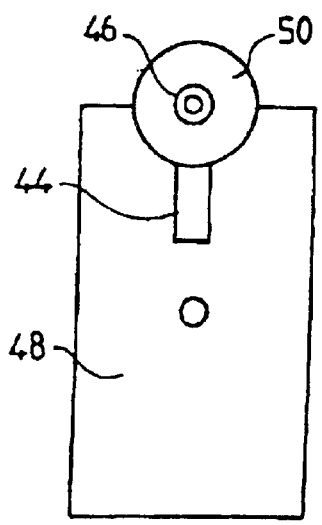
FIG. 3 is a plan view of the hook and of its support.
Figure 4:
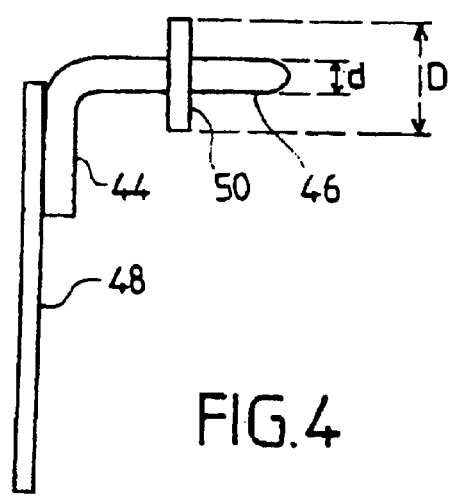
FIG. 4 is a side view corresponding to FIG. 3.

The hook 24 (FIGS. 3 and 4) is formed from a metal rod of circular section which is bent to define a horizontal branch 44 and a vertical branch 46 pointing downwards. This vertical branch 46 forms a cylindrical stud having a diameter d of a selected value.

The branch 44 is welded under a support plate 48 of generally rectangular shape mounted under the chassis 12 at the rear end 16.

The cylindrical stud 46 is fitted with a supporting washer 50 situated at a distance from the free end 52 of the cylindrical stud 46. This washer has a diameter D of a selected value.

The diameter d of the stud 46 should be less than the width 1 of the slot 26, while the diameter D of the washer 20 should be greater than the width 1 of the slot in the drawbar.

It will be understood indeed that the drawbar 22 of the trolley should be able to co-operate with a hook 24 (such as that shown in FIGS. 1, 3 and 4), this hook being provided on a towing unit, which can be a similar trolley to that described above, for example.

Thus the stud 46 of the hook can slide longitudinally in the slot 36 in the drawbar between two end positions (shown in broken lines in FIG. 2), with a sliding travel slightly less than the length L of the slot.

In a first end position (spaced-apart position), the hook is situated at the bend 28 in the drawbar and, in a second end position (close-together position), the hook is situated close to or against the crossbar 30 of the drawbar.

Figure 5:
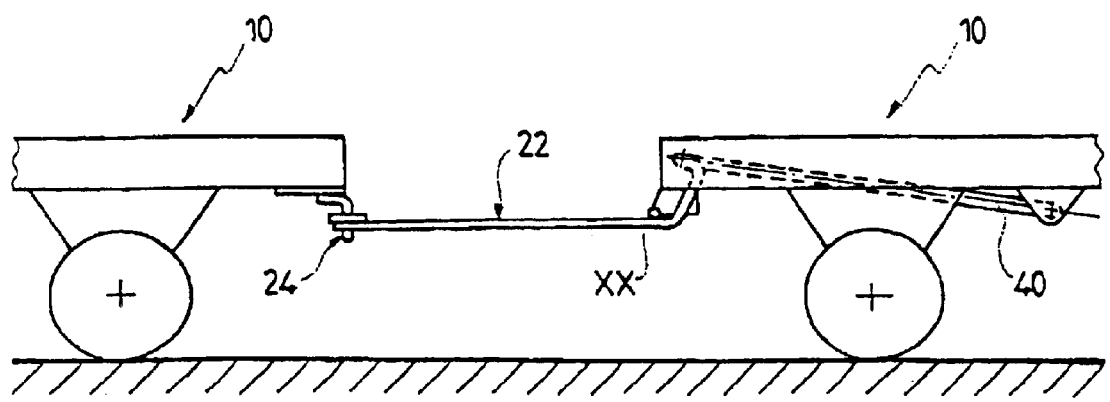
FIG. 5 is a partial view of two trolleys linked together by a coupling device according to the invention, the device being shown in a spaced-apart position for towing.

In the spaced-apart position in FIG. 5, which corresponds to a towing position, the working length of the drawbar is at its maximum, allowing sharp turns in particular.

Figure 6:
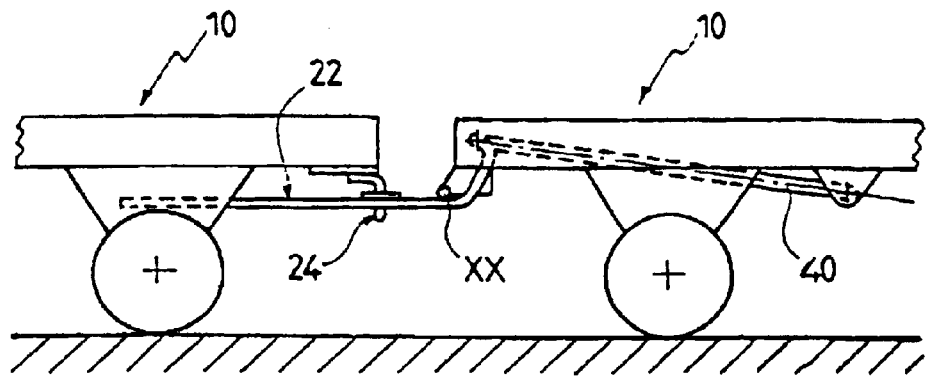
FIG. 6 is a view similar to FIG. 5, in which the device is shown in a close-together position intended to reduce the space requirement when stationary.

In the close-together position in FIG. 6, in contrast, which corresponds to a stationary position, the working length of the drawbar is at its minimum and the front end of the trolley is close or even in contact with the rear end of the towing unit (in this case another trolley). As a result, the space requirement when stationary is reduced.

The invention thus provides a telescopic coupling device which allows a variable working length of the drawbar.

In the positions shown in FIGS. 5 and 6, which correspond to a coupled position, the branches 26 of the drawbar 22 are substantially horizontal and cooperate with the hook 24. The operator can uncouple the trolley easily by pressing on the two branches of the drawbar, with his foot for example, in such a way as to disengage it from the hook.

Figure 7:
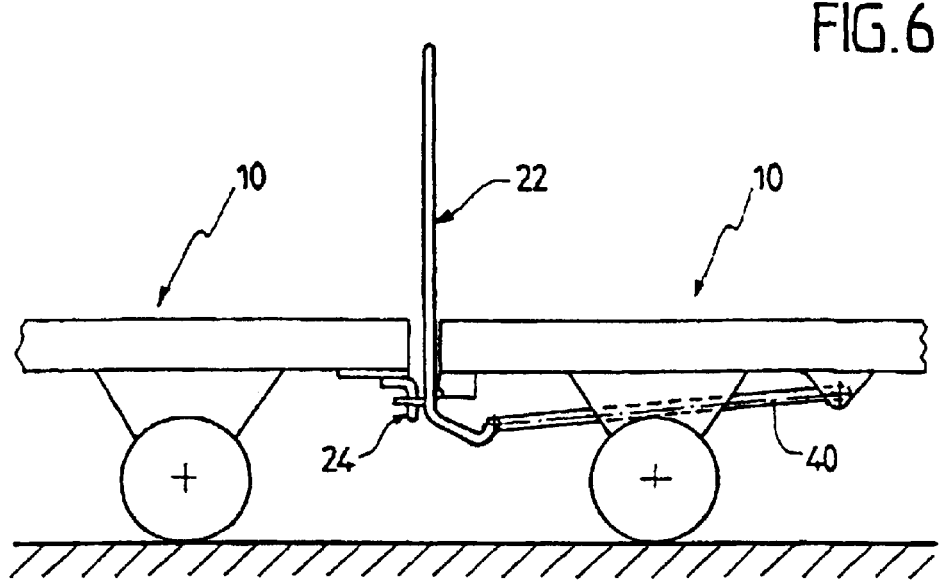
FIG. 7 is a partial view of two trolleys in the position in which they are closer together, in which the drawbar of a second trolley is in a substantially vertical upright position, being uncoupled from the hook of a first trolley.

Reference will now be made to FIG. 7, in which the drawbar 22 has pivoted beyond the raised position towards an upright position, in which it extends substantially vertically. The drawbar is held in this upright position by the action of the towing unit (in this case the previous trolley in the line) while being disengaged from the hook of the latter. In this way, a position in which the trolleys are as close together or are packed as close together as possible is obtained, allowing compaction and reducing the longitudinal space requirement of the whole.

Figure 8:
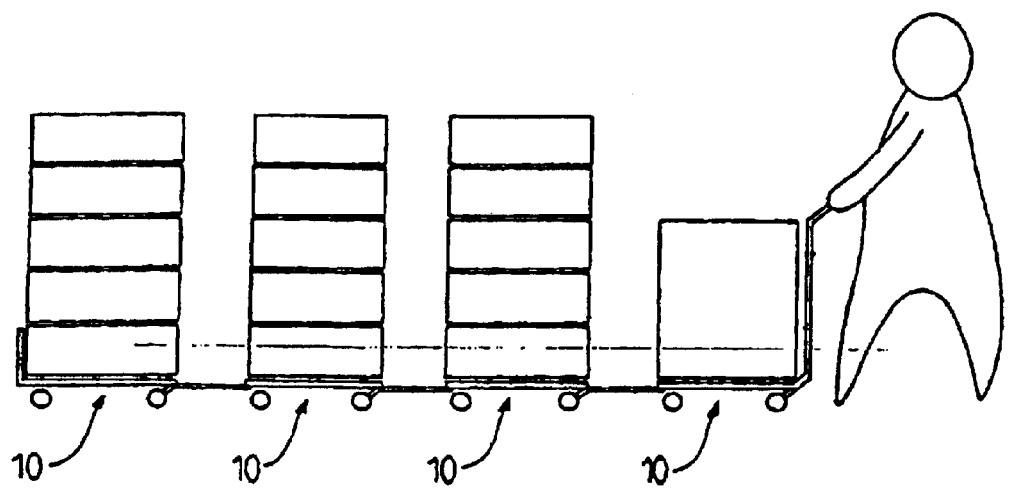
FIG. 8 is a side view of a line of trolleys shown in spaced-apart positions.
Figure 9:
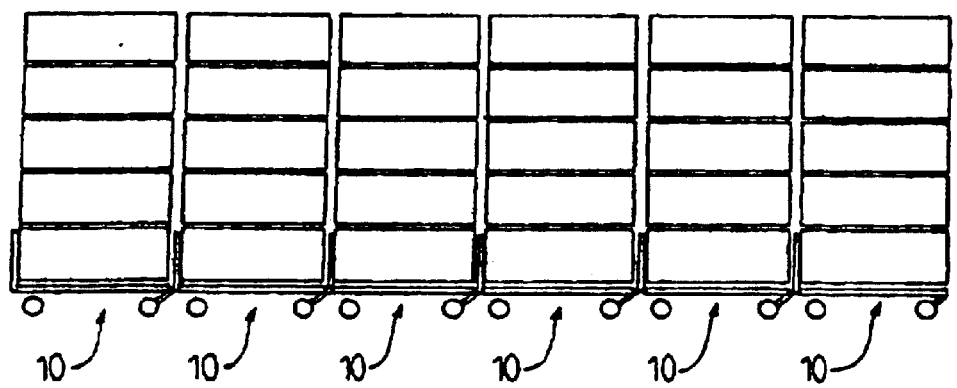
FIG. 9 is a side view of another line of trolleys showing them positioned close together.

It will be better understood with reference respectively to FIGS. 8 and 9 that the trolleys take up a maximum amount of space lengthways in the towing position in FIG. 8 and a minimum amount of space lengthways in the stationary position in FIG. 9, thus providing a compact arrangement.

As can be seen in FIGS. 8 and 9, the trolleys can be used to carry boxes or the like. In all cases, the trolleys are easily manoeuvrable and can be placed side by side, whether they are coupled or uncoupled.

Even in this close-together position, it is easy to deposit and remove the boxes.

The coupling device according to the invention can be mounted easily on standard trolleys without the need for significant modifications.

Of course, the invention is not limited to the embodiments described above by way of example and covers other variants.

Thus the elastic return means could just as well operate in compression.

A particular area of application for the invention is on handling trolleys used in industrial environments or in stations, airports etc.

What is claimed is:

1. Coupling device for a handling trolley, comprising a drawbar (22) mounted at the front of the trolley and designed to co-operate with a hook (24) mounted at the rear of a towing unit, such that two such equipped trolleys may be used together, wherein the drawbar (22) of one coupling device has a longitudinal slot (36) in which the hook (24) of another coupling device is able to slide so that the said hook can slide in the said longitudinal slot such that the two trolleys may be connected together by the drawbar of one trolley's coupling device and the hook of a second trolley's coupling device, wherein the drawbar (22) is connected to the front of the trolley by articulation means (30, 32) defining an articulation axis (XX) in such a way as to pivot between a coupling position, in which the drawbar extends substantially horizontally in order to co-operate with the hook, and a lifted position, in which the drawbar is in a raised position and is disengaged from the hook.

2. Coupling device according to claim 1, wherein the drawbar (22) forms an acute angle (α) relative to the vertical in the raised position.

3. Coupling device according to claim 2, wherein the acute angle (α) is about 10°.

4. Coupling device according to claim 1, wherein the drawbar (22) is likewise designed to pivot beyond the raised position towards an upright position, in which it extends substantially vertically under the action of towing unit, being disengaged from the hook of the latter.

5. Coupling device according to claim 1, wherein the articulation means (30, 32) extend along a substantially horizontal transverse axis (XX).

6. Coupling device according to claim 1, wherein the hook extends downward and further comprising an elastic return means (40) designed to urge the drawbar (22) towards its lifted position, and a support (48) for the downward extending hook provided under the towing unit in such a way that the drawbar is brought back elastically to bear on the support in order to ensure that the drawbar (22) and the hook (24) co-operate automatically.

7. Coupling device according to claim 6, wherein the elastic return means (40) is mounted at an anchoring point placed between the chassis (12) of the trolley and the drawbar (22).

8. Coupling device for a handling trolley, comprising a drawbar (22) mounted at the front of the trolley and designed to co-operate with a hook (24) mounted at the rear of a towing unit, such that two such equipped trolleys may be used together, wherein:

the drawbar (22) of one coupling device has a longitudinal slot (36) in which the hook (24) of another coupling device is able to slide so that the said hook can slide in the said longitudinal slot and the trolley can be such that the two trolleys are connected together by the drawbar of one trolley's coupling device and the hook of a second trolley's coupling device; and, wherein the drawbar (22) is connected to the front of the trolley by articulation means (30, 32) defining an articulation axis (XX) in such a way as to pivot between a coupling position, in which the drawbar extends substantially horizontally in order to co-operate with a hook, and a lifted position, in which the drawbar is in raised position and is disengaged from the hook, and wherein the hook extends downward;

further comprising an elastic return means (40) mounted at anchoring points, the elastic return means (40) operate in tension and are interposed between a first anchoring point (42) of the chassis of the trolley and a second anchoring point (38) situated opposite the drawbar in relation to it articulation axis (XX), thereby designed to urge the drawbar (22) towards it lifted position, and a support (48) for the downward extending hook positioned provided under the towing unit in such a way that the drawbar is brought back elastically to bear on the support in order to ensure that the drawbar (22) and the hook (24) co-operate automatically.

9. Coupling device according to claim 8, wherein the second anchoring point (38) is situated on an angled extension (34) provided opposite the drawbar (22) in relation to the articulation axis (XX) and is arranged in such a way, in the lifted position of the drawbar, the articulation axis (XX) of the drawbar (22), the second anchoring point (38) and the first anchoring point (42) are in the same plane.

* * * * *

UNITED STATES PATENT AND TRADEMARK OFFICE
CERTIFICATE OF CORRECTION

PATENT NO. : 6,874,807 B1  Page 1 of 1
APPLICATION NO. : 10/129277
DATED : April 5, 2005
INVENTOR(S) : Jean Labadie et al.

It is certified that error appears in the above-identified patent and that said Letters Patent is hereby corrected as shown below:

Column 6, line 39 claim 8, after "with," delete "a" and insert therein -- the --.

Column 6, line 40 claim 8, after "is in" insert therein -- a --.

Column 6, line 48 claim 8, after "to" delete "it" and insert therein -- its --.

Column 6, line 49 claim 8, after "towards" delete "it" and insert therein -- its --.

Column 6, line 58 claim 9, after "way," insert therein -- that --.

Signed and Sealed this

Sixth Day of May, 2008

JON W. DUDAS
*Director of the United States Patent and Trademark Office*